United States Patent
Morimoto (10) Patent No.: US 10,431,973 B2
(45) Date of Patent: Oct. 1, 2019

(54) SEMICONDUCTOR SWITCH CONTROL DEVICE

(71) Applicant: Yazaki Corporation, Tokyo (JP)

(72) Inventor: Mitsuaki Morimoto, Shizuoka (JP)

(73) Assignee: YAZAKI CORPORATION, Tokyo (JP)

(*) Notice: Subject to any disclaimer, the term of this patent is extended or adjusted under 35 U.S.C. 154(b) by 110 days.

(21) Appl. No.: 15/604,309

(22) Filed: May 24, 2017

(65) Prior Publication Data

US 2018/0019590 A1 Jan. 18, 2018

(30) Foreign Application Priority Data

Jul. 15, 2016 (JP) ................. 2016-140541

(51) Int. Cl.
| | |
|---|---|
| *H02H 9/02* | (2006.01) |
| *H02H 3/08* | (2006.01) |
| *H02H 3/087* | (2006.01) |

(52) U.S. Cl.
CPC ............. *H02H 9/025* (2013.01); *H02H 3/08* (2013.01); *H02H 3/087* (2013.01)

(58) Field of Classification Search
CPC .... G05F 1/00; G05F 1/56; G05F 5/00; H02M 7/537; H02M 1/08; H02P 6/00; H02P 6/24; H02P 6/26; H02H 9/00; H02H 9/02; H02H 9/025
USPC ............. 307/113, 66, 64, 38, 82, 80, 81, 39; 361/18, 91.2; 323/284, 286, 281; 713/300, 310
See application file for complete search history.

(56) References Cited

U.S. PATENT DOCUMENTS

| | | | |
|---|---|---|---|
| 6,222,355 B1* | 4/2001 | Ohshima | H03K 17/0822 323/282 |
| 9,806,520 B2 | 10/2017 | Kimura et al. | |
| 2009/0167272 A1* | 7/2009 | Furuichi | H03K 17/0822 323/284 |
| 2010/0097737 A1 | 4/2010 | Hirata et al. | |

(Continued)

FOREIGN PATENT DOCUMENTS

| | | |
|---|---|---|
| JP | H09-019053 A | 1/1997 |
| JP | 2002-034166 A | 1/2002 |

(Continued)

OTHER PUBLICATIONS

Japanese Office Action for the related Japanese Patent Application No. 2016-140541 dated Jul. 24, 2018.

(Continued)

*Primary Examiner* — Fritz M Fleming
*Assistant Examiner* — Jagdeep S Dhillon
(74) *Attorney, Agent, or Firm* — Kenealy Vaidya LLP (57) ABSTRACT

The semiconductor switch control device includes a first FET provided between an anode of a battery and a load and a second FET arranged between a cathode of the battery and the load, in which in a case where a current value that is larger than an abnormal current value indicating that a first drain current flowing through the first FET is an overcurrent and smaller than a maximum current value of the first drain current that can be tolerated by the first FET is set as a current limit value, a limiting gate voltage for setting the current value of the first drain current to a current limit value is applied to the second FET.

5 Claims, 6 Drawing Sheets

(56) References Cited

U.S. PATENT DOCUMENTS

| | | | |
|---|---|---|---|
| 2011/0032652 A1* | 2/2011 | Shimada | H02M 5/293 361/91.2 |
| 2011/0222192 A1* | 9/2011 | Fukuda | H02M 5/293 361/18 |
| 2012/0313609 A1* | 12/2012 | Fukumura | G05F 1/573 323/284 |
| 2013/0332750 A1* | 12/2013 | Souma | H02H 3/08 713/300 |
| 2015/0303839 A1* | 10/2015 | Ueno | H02P 27/08 318/400.22 |
| 2015/0346758 A1* | 12/2015 | Sakakibara | H02M 3/158 323/303 |
| 2016/0181794 A1 | 6/2016 | Kimura et al. | |
| 2016/0276955 A1* | 9/2016 | Harada | H02M 1/32 |

FOREIGN PATENT DOCUMENTS

| | | | |
|---|---|---|---|
| JP | 2003-284238 A | 10/2003 | |
| JP | 2008-295188 A | 12/2008 | |
| JP | 2010-104079 A | 5/2010 | |
| JP | 2011-166869 A | 8/2011 | |
| JP | 2012-23899 A | 2/2012 | |
| WO | 2015/030069 A1 | 3/2015 | |

OTHER PUBLICATIONS

Japanese Office Action for the related Japanese Patent Application No. 2016-140541 dated Oct. 2, 2018.
Japanese Report of Reconsideration by Examiner before Appeal for the related Japanese Patent Application No. 2016-140541 dated Jan. 29, 2019.

\* cited by examiner

SEMICONDUCTOR SWITCH CONTROL DEVICE

CROSS-REFERENCE TO RELATED APPLICATION(S)

The present application claims priority to and incorporates by reference the entire contents of Japanese Patent Application No. 2016-140541 filed in Japan on Jul. 15, 2016.

BACKGROUND OF THE INVENTION

1. Field of the Invention

The present invention relates to a semiconductor switch control device.

2. Description of the Related Art

In the related art, electric vehicles, hybrid electric vehicles, and the like are equipped with a load such as a motor and a battery for driving the load, and a switch for conducting or blocking a current flowing from the battery to the load for the purpose of security is provided. As such switches, mechanical relays are mainly used. However, in recent years, it has been considered to use semiconductor switches. In a case where an overcurrent flows due to a short circuit or the like, the current is controlled to be blocked in order to protect the semiconductor switch (for example, in Japanese Patent Application Laid-open No. 2012-23899).

In a case where an overcurrent flows due to a short circuit or the like, there is a problem in that the semiconductor switch may be overheated and, and, thus, it may be difficult to control blocking the current.

SUMMARY OF THE INVENTION

In view of the aforementioned problems, the present invention is to provide a semiconductor switch control device capable of suppressing an increase in temperature of a semiconductor switch and capable of appropriately blocking a current in a case where an overcurrent flows due to a short circuit or the like.

In order to solve the above mentioned problem and achieve the object, a semiconductor switch control device according to one aspect of the present invention includes a first semiconductor switch provided between an anode of a power supply and a load to conduct or block a current flowing from the power supply to the load; a second semiconductor switch provided between the load and a cathode of the power supply to regulate the current flowing from the load to the power supply according to an applied setting gate voltage and limit a current flowing through the first semiconductor switch; and a controller configured to control the first semiconductor switch and the second semiconductor switch, wherein in a case where a current value that is larger than an abnormal current value indicating that a first semiconductor input current which is the current flowing through the first semiconductor switch is an overcurrent and smaller than a maximum current value of a current which is larger than the abnormal current value and can be tolerated by the first semiconductor switch is set as a current limit value, the controller applies a limiting gate voltage for setting a current value of the first semiconductor input current to the current limit value as the setting gate voltage to the second semiconductor switch.

According to another aspect of the present invention, in the semiconductor switch control device, it is preferable that the first semiconductor switch can regulate the current flowing from the power supply to the load according to an applied gate voltage and is applied with a gate voltage that is not limited to a conducting current.

According to still another aspect of the present invention, in the semiconductor switch control device, it is preferable that in a case where the current value of the first semiconductor input current is equal to or smaller than the abnormal current value, the controller applies a gate voltage equivalent to a gate voltage applied to the first semiconductor switch to the second semiconductor switch, and in a case where the current value of the first semiconductor input current is larger than the abnormal current value, the controller applies the limiting gate voltage to the second semiconductor switch.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Modes (embodiments) for carrying out the present invention will be described in detail with reference to the drawings. The present invention is not limited by the contents described in the following embodiments. In addition, the components described below include those which can be easily assumed by the skilled in the art and substantially the same components. In addition, the configurations described below can be appropriately combined. In addition, various omissions, substitutions, or changes in the configuration can be implemented within the scope without departing from the spirt of the present invention.

First Embodiment

Figure 1:
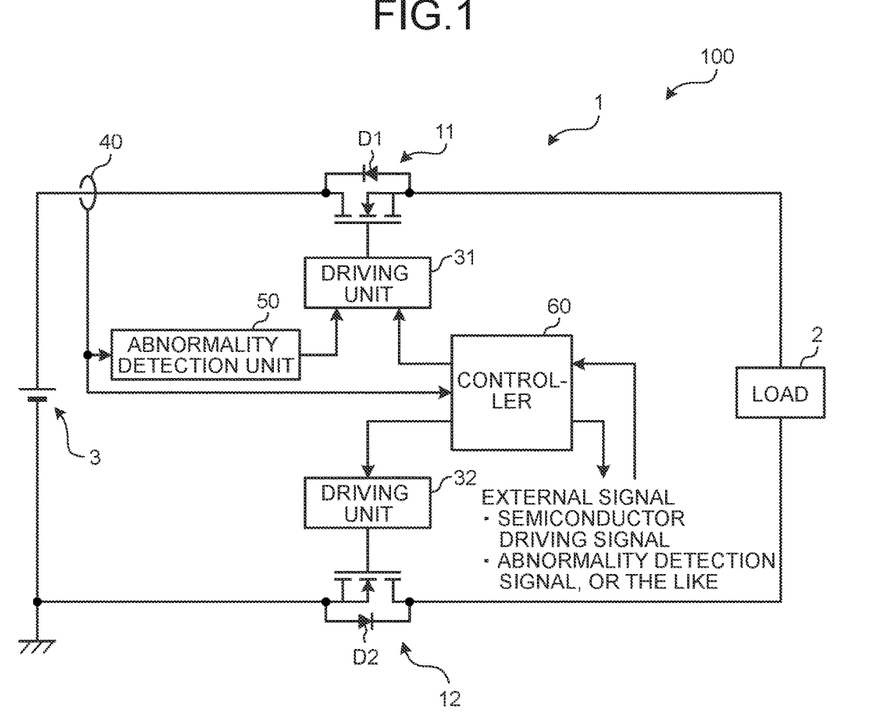
FIG. 1 is a block diagram illustrating an example of a configuration of a semiconductor switch control device according to a first embodiment.

As illustrated in FIG. 1, a vehicle power supply system 100 such as an electric vehicle or a hybrid electric vehicle is provided with a semiconductor switch control device 1 which is equipped with a load 2 such as a motor and a battery 3 as a power supply for driving the load 2 to conduct or block a current flowing from the battery 3 to the load 2 for the purpose of security.

The semiconductor switch control device 1 according to the first embodiment is configured to include an FET (Field-Effect Transistor) 11 as a first semiconductor switch, an FET 12 as a second semiconductor switch, a driving unit 31, a driving unit 32, a current detection unit 40, an abnormality detection unit 50, and a controller 60.

The FET 11 is provided between the anode of the battery 3 and the load 2 and has a function of turning on or off a current and a function of regulating a current flowing from the battery 3 to the load 2 according to an applied gate voltage. The FET 11 is, for example, an N-channel MOS (Metal-Oxide-Semiconductor) FET. In the FET 11, a body diode (parasitic diode) D1 is arranged in a direction opposite to the direction in which a current (forward current) flows. The cathode terminal of the body diode D1 is connected to the anode side of the battery 3, and the anode terminal thereof is connected to the load 2 side. The FET 11 is driven by a driving unit 31 described later to conduct or block a current flowing from the anode of the battery 3 to the load 2.

The FET 12 is provided between the load 2 and the cathode of the battery 3 and has a function of turning on or off a current and a function of regulating a current flowing from the load 2 to the battery 3 according to an applied gate voltage (setting gate voltage). The FET 12 is, for example, an N-channel MOSFET. In the FET 12, a body diode (parasitic diode) D2 is arranged in a direction opposite to the direction in which a current (forward current) flows. The FET 12 is driven by a driving unit 32 to be described later and regulates the current flowing from the load 2 to the battery 3 according to an applied limiting gate voltage VGS to limit a current flowing through the FET 11.

The driving unit 31 sets the FET 11 to ON or OFF under the control of the controller 60. In addition, the driving unit 31 sets the FET 11 to OFF on the basis of detection signal output from the abnormality detection unit 50. The driving unit 31 is connected to the gate terminal of the FET 11 and applies an ON voltage to the gate terminal of the FET 11 as a control to turn on the switch of the FET 11, so that a current is allowed to flow from the drain terminal to the source terminal. In addition, the driving unit 31 applies an OFF voltage to the gate terminal of the FET 11 as a control to turn off the switch of the FET 11, so that a current flowing from the drain terminal to the source terminal is blocked.

The driving unit 32 sets the FET 12 to ON or OFF under the control of the controller 60. The driving unit 32 is connected to the gate terminal of the FET 12 and applies an ON voltage to the gate terminal of the FET 12 as a control to turn on the switch of the FET 12, so that a current is allowed to flow from the drain terminal to the source terminal. In addition, the driving unit 32 applies an OFF voltage to the gate terminal of the FET 12 as a control to turn off the switch of the FET 12, so that a current flowing from the drain terminal to the source terminal is blocked. In addition, the driving unit 32 regulates the drain current flowing through the FET 12 under the control of the controller 60. The driving unit 32 regulates the current flowing from the drain terminal to the source terminal by applying a limited ON voltage (limiting gate voltage VGS) to the gate terminal of the FET 12.

The current detection unit 40 detects a current flowing between the battery 3 and the load 2. The current detection unit 40 is, for example, a Hall type current sensor using a Hall element as a magnetoelectric conversion element and detects a current value in a non-contact manner. The current detection unit 40 detects a current flowing between the anode of the battery 3 and the FET 11 and outputs a current value of the detected current to the abnormality detection unit 50 and the controller 60.

The abnormality detection unit 50 detects abnormality of the current. The abnormality detection unit 50 is connected to the current detection unit 40 and detects the abnormality on the basis of the current value (detected current value) of the detected current output from the current detection unit 40. In a case where the detected current value is extremely large, the abnormality detection unit 50 detects that the current is abnormal. For example, the abnormality detection unit 50 compares the detected current value with a preset current reference value to detect that the detected current value is abnormal in a case where the detected current value exceeds the current reference value and turns OFF the FET 11 through the driving unit 31. As a result, in a case where an obvious overcurrent flows, the abnormality detection unit 50 can immediately block the current flowing from the battery 3 to the load 2. Since the abnormality detection unit 50 detects abnormality without providing the blocking determination time T like the controller 60 described later, it is possible to detect the abnormality of the detected current earlier than the determination of the overcurrent by the controller 60.

Figure 2:
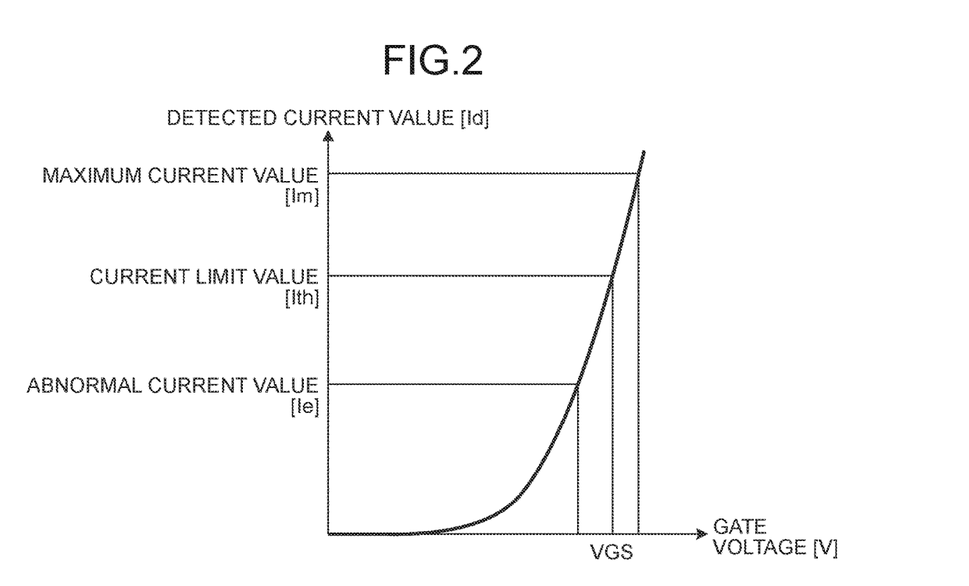
FIG. 2 is a diagram illustrating a relationship between a gate voltage and a drain current according to the first embodiment.

The controller 60 controls the FET 11 and the FET 12. The controller 60 controls the FET 11 through the driving unit 31 and controls the FET 12 through the driving unit 32. In the case of turning on the FET 11, the controller 60 controls the driving unit 31 so as to apply a gate voltage that is not limited to the conducting current. For example, the controller 60 applies a gate voltage for setting the same current value as the maximum current value Im illustrated in FIG. 2. As a result, the controller 60 can reduce on-resistance between the drain terminal and the source terminal of the FET 11. In addition, as illustrated in FIG. 2, in the case of turning on the FET 12, the controller 60 applies, to the FET 12, the limiting gate voltage VGS for setting the current value of the first drain current (first semiconductor input current) which is the drain current flowing through the FET 11 to the current limit value Ith. In addition, FIG. 2 illustrates a relationship between the current value of the first drain current (hereinafter, also referred to as a detected current value Id) and the gate voltage V. The vertical axis indicates the detected current value Id, and the horizontal axis indicates the gate voltage V. Herein, the current limit value Ith is a predetermined voltage value which is a current value larger than the abnormal current value Ie and smaller than the maximum current value Im. The current limit value Ith may be any value which is between the abnormal current value Ie and the maximum current value Im. For example, a central value between the abnormal current value Ie and the maximum current value Im can be considered to be the current limit value Ith. The abnormal current value Ie is a current value indicating that the first drain current flowing through the FET 11 is an overcurrent, and for example, the abnormal current value Ie is a current value larger than a rated current. The maximum current value Im is a current value larger than the abnormal current value Ie and is the maximum current value of the first drain current that can be tolerated by the FET 11. The maximum current value Im is, for example, a current value at which the FET 11 is destroyed if the detected current value Id of the first drain current exceeds the maximum current value Im. In addition, the abnormal current value Ie may be any current value that is smaller than the maximum current value Im and is a current value by which it can be detected that the first drain current flowing through the FET 11 is an overcurrent. The controller 60 controls the FETs 11 and 12 in response to a request from an external device (not illustrated). For example, the controller 60 sets the FETs 11 and 12 to ON on the basis of a semiconductor driving signal output from the external device. In addition, the controller 60 sets the FETs 11 and 12 to OFF, for example, on the basis of an abnormality detection signal output from the external device.

Figure 3:
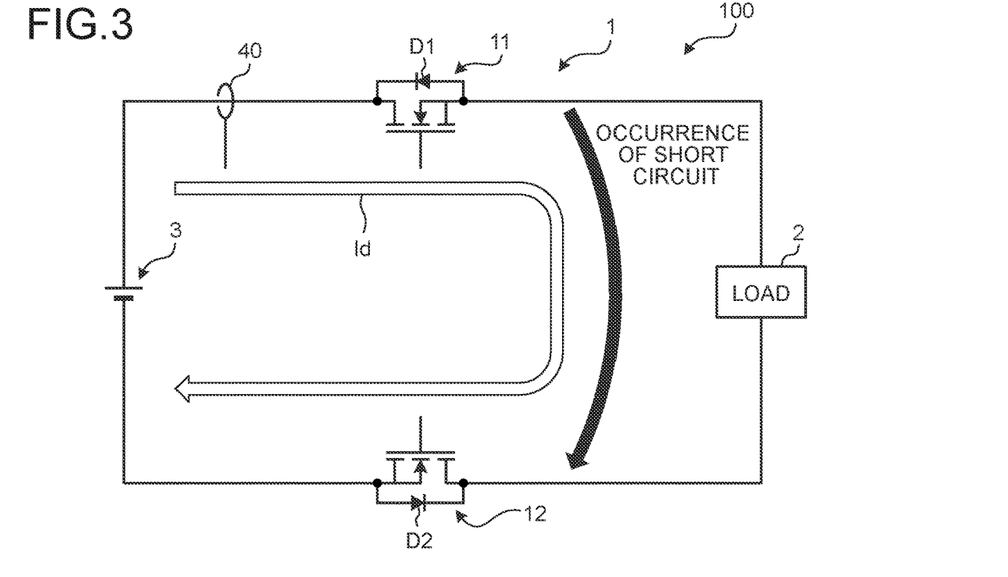
FIG. 3 is a block diagram illustrating an example of operations at the time of occurrence of a short circuit according to the first embodiment.
Figure 4:
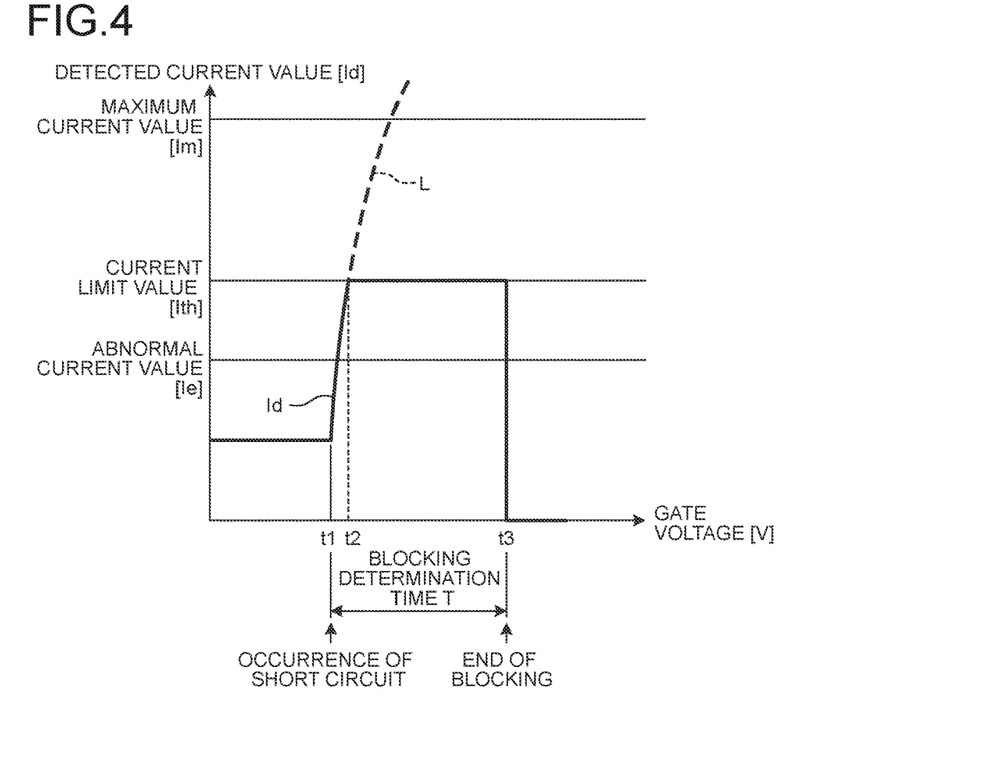
FIG. 4 is a diagram illustrating an example of current limiting at the time of occurrence of a short circuit according to the first embodiment.

Next, an example of operations of the semiconductor switch control device 1 will be described. In this example, as illustrated in FIG. 3, the case where a short circuit occurs due to connection of the source terminal side of the FET 11 and the drain terminal side of the FET 12 without the load 2 will be described. In this case, as illustrated in FIG. 4, in the semiconductor switch control device 1, the detected current value Id rises at the time t1 when the short circuit occurs, and the detected current value Id reaches the abnormal current value Ie substantially at the same time as the occurrence of the short circuit. The semiconductor switch control device 1 starts time measurement from the time t1 in order to measure the blocking determination time T. In the semiconductor switch control device 1, the detected current value Id reaches the current limit value Ith at the time t2, and the detected current value Id is limited to the current limit value Ith by the FET 12. Namely, the detected current value Id rises with the elapse of time from the time t1 when the short circuit occurs and reaches the current limit value Ith at the time t2, and after that, the detected current value is limited to the current limit value Ith. In the semiconductor switch control device 1, the blocking determination time T which is a time interval from the occurrence of the short circuit until the determination of the blocking ends at the time t3, and since the detected current value Id does not become equal to or smaller than the abnormal current value Ie during the time interval from the time t1 to time t3, it is determined that a short circuit has occurred. And thus, the FET 11 is set to OFF so as to block the current flowing from the battery 3 to the load 2.

On the other hand, in the semiconductor switch control device 1, if the detected current value Id reaches the abnormal current value Ie at the time t1 and the detected current value Id becomes equal to or smaller than the abnormal current value Ie before the blocking determination time T elapses, it is determined that the detected current value Id temporarily rises due to noise or the like, and the FET 11 is not set to OFF. In this manner, since the semiconductor switch control device 1 is provided with the blocking determination time T, erroneous blocking due to noise or the like can be avoided. In addition, a broken line L illustrated in FIG. 4 is Comparative Example, and in a case where the current limit value Ith is not provided as in the related art, the detected current value Id reaches the maximum current value Im within the blocking determination time T.

As described above, in the semiconductor switch control device 1 according to the first embodiment, in a case where a current value that is larger than the abnormal current value Ie indicating that the first drain current flowing through the FET 11 is an overcurrent and smaller than the maximum current value Im of the first drain current that can be tolerated by the FET 11 is set as the current limit value Ith, the limiting gate voltage VGS for setting the current value of the first drain current to the current limit value Ith is applied to the FET 12. As a result, the semiconductor switch control device 1 can reduce the current value of the first drain current to be smaller than the maximum current value Im even in a case where a short circuit or the like occurs and an overcurrent flows through the FET 11. Therefore, since the detected current value Id does not exceed the maximum current value Im, the semiconductor switch control device 1 can suppress an increase in temperature of the FET 11, so that the FET 11 can be protected. Furthermore, even in a case where the blocking determination time T from the occurrence of a short circuit or the like to the blocking is provided, since the detected current value Id does not exceed the maximum current value Im, the semiconductor switch control device 1 can suppress an increase in temperature of the FET 11. In addition, since the blocking determination time T is provided, even in a case where the detected current value Id is temporarily increased due to noise or the like and exceeds the abnormal current value Ie, the semiconductor switch control device 1 can prevent the FET 11 from erroneously blocking. According to short circuit conditions, the semiconductor switch control device 1 may cause the FET 12 to exceed a safe operating area (SOA), and thus, the FET 12 may fail. However, in this case, since the current flowing through the FET 11 is limited, the FET 11 can be protected, and the current can be appropriately blocked at the time of short circuit or the like. In addition, since the semiconductor switch control device 1 can protect the FET 11 without changing the configurations of the existing FETs 11 and 12, an increase in cost can be suppressed.

In addition, in the semiconductor switch control device 1, the FET 11 can regulate the current flowing from the battery 3 to the load 2 according to the applied gate voltage, and a gate voltage that is not limited to the conducting current is applied. Therefore, the semiconductor switch control device 1 can reduce the on-resistance of the FET 11 and can suppress a loss of the current flowing through the FET 11.

Modified Example

Figure 5:
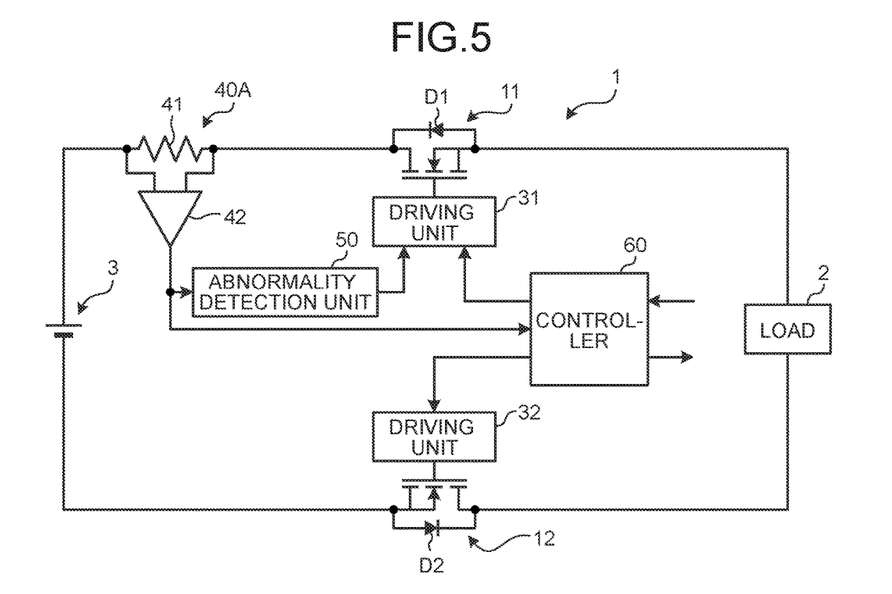
FIG. 5 is a block diagram illustrating an example of a shunt type current detection according to a modified example.
Figure 6:
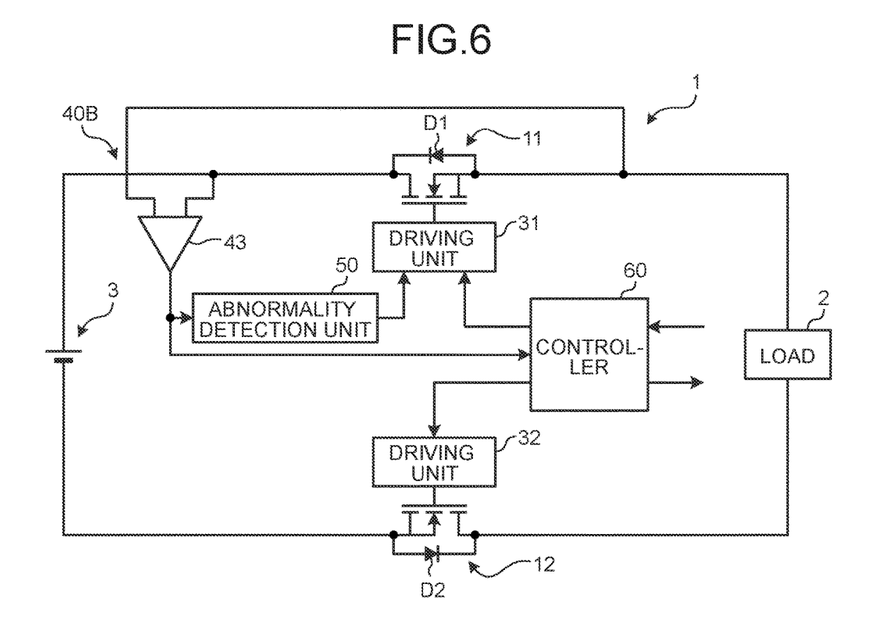
FIG. 6 is a block diagram illustrating an example of a VDS type current detection according to a modified example.

Next, a modified example of the first embodiment will be described. Although the current detection unit 40 is described to be a Hall current sensor, the present invention is not limited thereto. For example, as illustrated in FIG. 5, the current detection unit 40 may be a shunt type current sensor (current detection unit 40A). In this case, the current detection unit 40A is configured to include a shunt resistor 41 and a differential amplifier circuit 42 and amplifies the voltage drop generated by resistance of the shunt resistor 41 by using the differential amplifier circuit 42 and detects a current from the amplified voltage drop. In addition, as illustrated in FIG. 6, the current detection unit 40 may be a VDS type current sensor (current detection unit 40B). In this case, the current detection unit 40B amplifies the voltage drop generated in the FET 11 by the differential amplifier circuit 43 and detects a current from the amplified voltage drop.

In addition, the FET 11 and the FET 12 are not limited to MOSFETs, but for example, an IGBT (Insulated Gate Bipolar Transistor) may be used. In this case, a current regulating IGBT (IGBT corresponding to the FET 12 of the first embodiment) provided between the cathode of the battery 3 and the load 2 is applied with the limiting gate voltage VGE for setting a current value of a collector current flowing between the collector terminal and the emitter terminal to the current limit value Ith.

Reference Example

As Reference Example of the first embodiment, it is also conceivable to use bipolar transistors for the FET 11 and the FET 12. In this case, in the current regulating bipolar transistor (bipolar transistor corresponding to the FET 12 of the first embodiment) provided between the cathode of the battery 3 and the load 2, a voltage is applied between the base terminal and the emitter terminal to flow a base current, so that a current value of a collector current flowing between the collector terminal and the emitter terminal is controlled to be the current limit value Ith by the base current.

Second Embodiment

Figure 7:
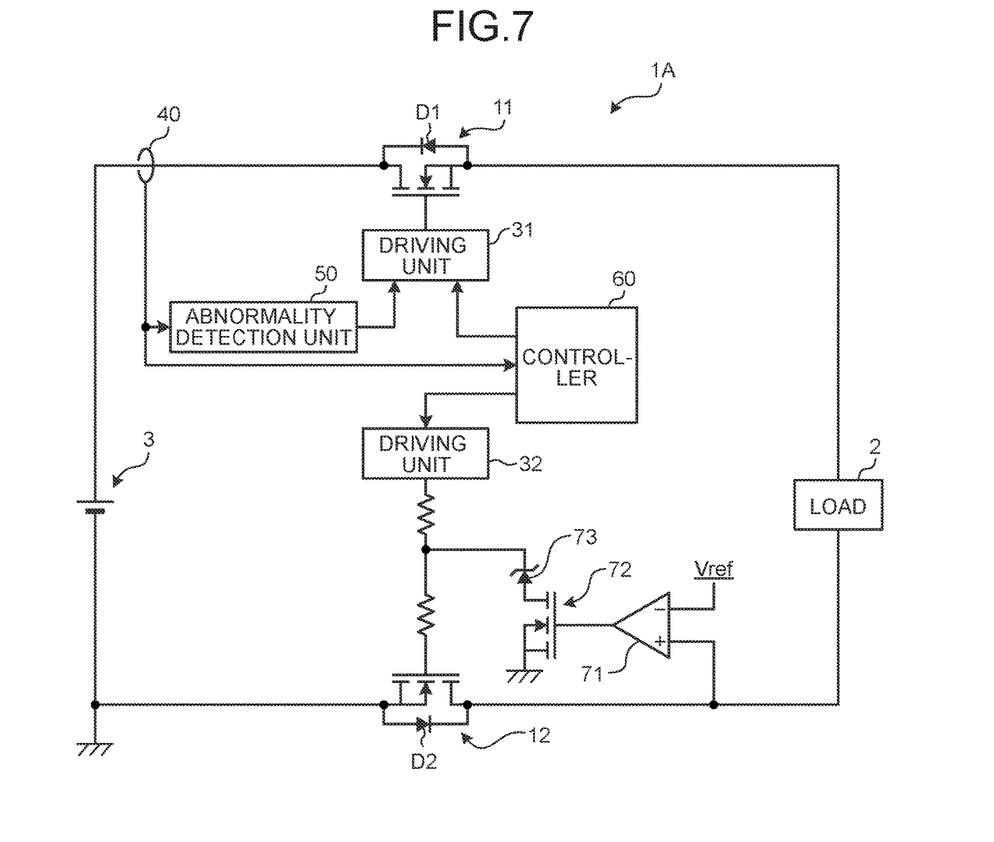
FIG. 7 is a block diagram illustrating an example of a configuration of main components of a semiconductor switch control device according to a second embodiment.

Next, a semiconductor switch control device 1A according to a second embodiment will be described. In the semiconductor switch control device 1A according to the second embodiment, the same components as those of the semiconductor switch control device 1 according to the first embodiment are denoted by the same reference numerals, and detailed description thereof will be omitted. This embodiment is different from the first embodiment in that, in order to reduce the on-resistance of the FET 12, the semiconductor switch control device 1A normally sets the gate voltage of the FET 12 to be large, and at the time of occurrence of a short circuit, the semiconductor switch control device 1A changes the gate voltage to the limiting gate voltage VGS for setting the current value of the first drain current to the current limit value Ith.

As illustrated in FIG. 7, the semiconductor switch control device 1A is configured to further include a differential amplifier circuit 71, a semiconductor switch 72, and a constant voltage diode 73. In the differential amplifier circuit 71, the drain voltage of the FET 12 is input to the anode thereof, the threshold voltage Vref is input to the cathode thereof, and the difference between the drain voltage and the threshold voltage Vref is amplified and applied to the gate terminal of the semiconductor switch 72. At the time of occurrence of a short circuit or the like, if an overcurrent flows to be applied to the gate terminal of the semiconductor switch 72, the constant voltage diode 73 applies a constant voltage (limiting gate voltage VGS) to the gate terminal of the FET 12. If no overcurrent flows, the semiconductor switch control device 1A applies a gate voltage equivalent to that of the FET 11 to the FET 12, and if an overcurrent flows, the semiconductor switch control device 1A changes the gate voltage equivalent to the FET 11 to the limiting gate voltage VGS. In addition, the time for changing from the gate voltage equivalent to that of the FET 11 to the limiting gate voltage VGS is a time required for processing by the analog circuit and is shorter than the blocking determination time T set for preventing erroneous blocking. In addition, herein, although the limiting gate voltage VGS is generated by the constant voltage diode 73, the limiting gate voltage VGS may be generated by dividing by resistance.

As described above, in the semiconductor switch control device 1A according to the second embodiment, in a case where an overcurrent does not flow and the current value of the first drain current is equal to or smaller than the abnormal current value Ie, the gate voltage equivalent to the gate voltage applied to the FET 11 is applied to the FET 12, and in a case where an overcurrent flows and the current value of the first drain current is larger than the abnormal current value Ie, the limiting gate voltage VGS for setting the current value of the first drain current to the current limit value Ith is applied to the FET 12. As a result, in a case where the first drain current flowing through the FET 11 is not an overcurrent, the semiconductor switch control device 1A applies the gate voltage equivalent to that of the FET 11 to the FET 12, so that the on-resistance of the FET 12 can be reduced and power loss can be suppressed.

Third Embodiment

Figure 8:
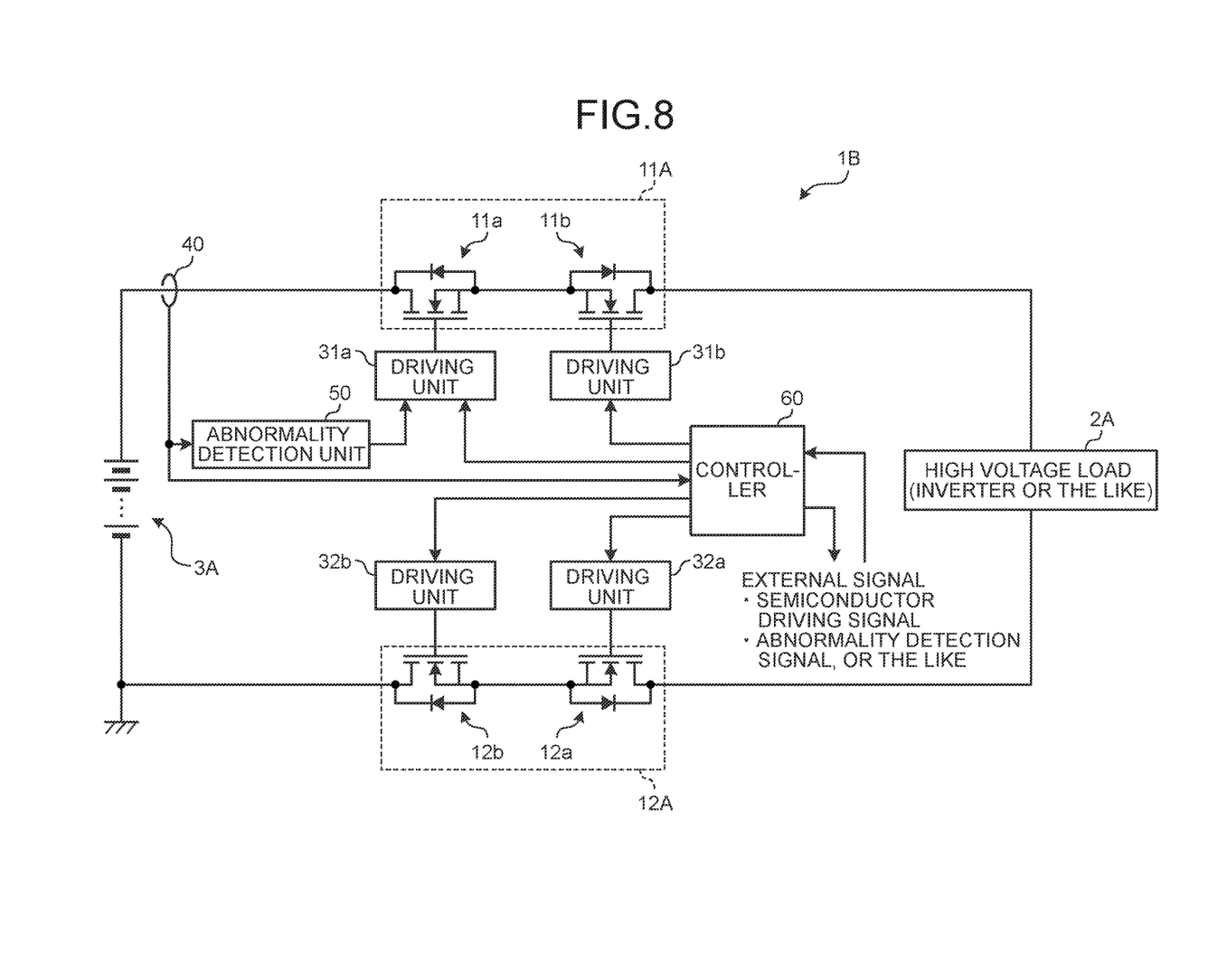
FIG. 8 is a block diagram illustrating an example of a configuration of a semiconductor switch control device according to a third embodiment.

Next, a semiconductor switch control device 1B according to a third embodiment will be described. In the semiconductor switch control device 1B according to the third embodiment, the same components as those of the semiconductor switch control device 1 according to the first embodiment are denoted by the same reference numerals, and detailed description thereof will be omitted. As illustrated in FIG. 8, this embodiment is different from the first embodiment in that the semiconductor switch control device 1B is applied to a high voltage circuit and has a charging path for charging electric power from a high voltage load 2A as a load to a high voltage battery 3A as a power supply.

The semiconductor switch control device 1B is configured to include a bidirectional blocking circuit 11A on the upstream side between the anode of the high voltage battery 3A and the high voltage load 2A. The bidirectional blocking circuit 11A on the upstream side is configured to include an FET 11a as a first semiconductor switch, an FET 11b as a first semiconductor switch, a driving unit 31a driving the FET 11a, and a driving unit 31b driving the FET 11b. The source terminals of the FET 11a and the FET 11b are connected in series, the drain terminal of the FET 11a is connected to the high voltage battery 3A, and the drain terminal of the FET 11b is connected to the high voltage load 2A. The FET 11a functions as a switch when a current flows from the high voltage battery 3A to the high voltage load 2A, namely, during discharging. The FET 11b functions as a switch when a current flows from the high voltage load 2A to the high voltage battery 3A, namely, during charging.

Similarly, the semiconductor switch control device 1B is configured to include a bidirectional regulating circuit 12A on the downstream side between the high voltage load 2A and the cathode of the high voltage battery 3A. The bidirectional regulating circuit 12A on the downstream side is configured to include an FET 12a as a second semiconductor switch, an FET 12b as a second semiconductor switch, a driving unit 32a driving the FET 12a, and a driving unit 32b driving the FET 12b. The source terminals of the FET 12a and the FET 12b are connected in series, the drain terminal of the FET 12b is connected to the high voltage battery 3A, and the drain terminal of the FET 12a is connected to the high voltage load 2A. The FET 12a functions as a current regulator when a current flows from the high voltage battery 3A to the high voltage load 2A, namely, when the current discharges. The FET 12b functions as a current regulator when a current flows from the high voltage load 2A to the high voltage battery 3A, namely, when charging.

In the semiconductor switch control device 1B according to the third embodiment, during the discharging, in a case where a current value that is larger than the abnormal current value Ie indicating that the first drain current flowing through the FET 11a is an overcurrent and smaller than the maximum current value Im of the first drain current that can be tolerated by the FET 11a is set as the current limit value Ith, the limiting gate voltage VGS for setting the current value of the first drain current to the current limit value Ith is applied to the FET 12a. In addition, in the semiconductor switch control device 1B, during the charging, in a case where a current value that is larger than the abnormal current value Ie indicating that the first drain current flowing through the FET 11b is an overcurrent and smaller than the maximum current value Im of the first drain current that can be tolerated by the FET 11b is set as the current limit value Ith, the limiting gate voltage VGS for setting the current value of the first drain current to the current limit value Ith is applied to the FET 12b. Therefore, even in a case where a short circuit or the like occurs in the high voltage circuit during the discharging and an overcurrent flows to the FET 11a, the semiconductor switch control device 1B can appropriately turn off the FET 11a. In addition, even in a case where a short circuit or the like occurs in the high-voltage circuit during the charging and an overcurrent flows to the FET 11b, the semiconductor switch control device 1B can appropriately turn off the FET 11b.

In a semiconductor switch control device according to the present embodiments, since a limiting gate voltage for setting a current value of a current flowing through a first semiconductor switch to a current limit value larger than an abnormal current value and smaller than a maximum current value is applied to a second semiconductor switch, in a case where an overcurrent flows due to a short circuit or the like, it is possible to suppress an increase in temperature of the first semiconductor switch and to appropriately block the current.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A semiconductor switch control device comprising:
   a first semiconductor switch provided between an anode of a power supply and a load to conduct or block a current flowing from the power supply to the load;
   a second semiconductor switch provided between the load and a cathode of the power supply to regulate the current flowing from the load to the power supply according to an applied setting gate voltage and limit a current flowing through the first semiconductor switch; and
   a controller configured to control the first semiconductor switch and the second semiconductor switch, wherein
   in a case where a current value that is larger than an abnormal current value indicating that a first semiconductor input current which is the current flowing through the first semiconductor switch is an overcurrent and smaller than a maximum current value of a current which is larger than the abnormal current value and can be tolerated by the first semiconductor switch is set as a current limit value, the controller applies a limiting gate voltage to the second semiconductor switch such that the limiting gate voltage sets a current value of the first semiconductor input current to the current limit value.

2. The semiconductor switch control device according to claim 1, wherein
   the first semiconductor switch can regulate the current flowing from the power supply to the load according to an applied gate voltage and is applied with a gate voltage that is not limited to a conducting current.

3. The semiconductor switch control device according to claim 1, wherein
   in a case where the current value of the first semiconductor input current is equal to or smaller than the abnormal current value, the controller applies a gate voltage equivalent to a gate voltage applied to the first semiconductor switch to the second semiconductor switch, and
   in a case where the current value of the first semiconductor input current is larger than the abnormal current value, the controller applies the limiting gate voltage to the second semiconductor switch.

4. The semiconductor switch control device according to claim 2, wherein
   in a case where the current value of the first semiconductor input current is equal to or smaller than the abnormal current value, the controller applies a gate voltage equivalent to a gate voltage applied to the first semiconductor switch to the second semiconductor switch, and
   in a case where the current value of the first semiconductor input current is larger than the abnormal current value, the controller applies the limiting gate voltage to the second semiconductor switch.

5. A semiconductor switch control device comprising:
   a first semiconductor switch provided between an anode of a power supply and a load to conduct or block a current flowing from the power supply to the load;
   a second semiconductor switch provided between the load and a cathode of the power supply to regulate the current flowing from the load to the power supply according to an applied setting gate voltage and limit a current flowing through the first semiconductor switch; and
   a controller configured to control the first semiconductor switch and the second semiconductor switch, wherein
   in a case where a current value that is larger than an abnormal current value indicating that a first semiconductor input current which is the current flowing through the first semiconductor switch is an overcurrent and smaller than a maximum current value of a current which is larger than the abnormal current value and can be tolerated by the first semiconductor switch is set as a current limit value, the controller applies a limiting gate voltage to the second semiconductor switch such that the limiting gate voltage sets a current value of the first semiconductor input current to the current limit value,
   the controller turns off the first semiconductor switch when the first semiconductor input current does not become equal to or less than the abnormal current value in a blocking determination time from when the first semiconductor input current reaches the abnormal current value until when the first semiconductor switch is determined to be blocked, and
   the controller does not turn off the first semiconductor switch when the first semiconductor input current reaches the abnormal current value and the first semiconductor input current becomes equal to or lower than the abnormal current value before the blocking determination time elapses.

* * * * *